United States Patent [19]
Arriola

[11] Patent Number: 5,737,120
[45] Date of Patent: Apr. 7, 1998

[54] LOW WEIGHT, ACHROMATIC, ATHERMAL, LONG WAVE INFRARED OBJECTIVE LENS

[75] Inventor: Edmund W. Arriola, Westminster, Calif.

[73] Assignee: Corning Incorporated, Corning, N.Y.

[21] Appl. No.: 403,419

[22] Filed: Mar. 14, 1995

[51] Int. Cl.$^6$ .................. G02B 5/32; G02B 5/18; G02B 13/14

[52] U.S. Cl. .................. 359/356; 359/16; 359/19; 359/565; 359/566

[58] Field of Search .................. 359/356, 357, 359/354, 565, 566, 571, 16, 19, 15

[56] References Cited

U.S. PATENT DOCUMENTS

| | | | |
|---|---|---|---|
| 2,512,257 | 6/1950 | Pfund. | |
| 2,659,271 | 11/1953 | Treuting | 359/356 |
| 2,972,932 | 2/1961 | Marcus. | |
| 3,217,596 | 11/1965 | Murray. | |
| 3,363,962 | 1/1968 | Vogl. | |
| 3,567,304 | 3/1971 | Kruger. | |
| 3,598,466 | 8/1971 | Friedl | 359/16 |
| 3,622,218 | 11/1971 | Kruger. | |
| 3,674,330 | 7/1972 | Strong | 359/356 |
| 3,992,078 | 11/1976 | Freeman. | |
| 4,494,819 | 1/1985 | Lidwell. | |
| 4,537,464 | 8/1985 | Boutellier. | |
| 4,871,219 | 10/1989 | Cooper. | |
| 4,921,318 | 5/1990 | Rayleigh. | |
| 5,044,706 | 9/1991 | Chen. | |
| 5,148,314 | 9/1992 | Chen | 359/565 |
| 5,161,057 | 11/1992 | Johnson | 359/565 |
| 5,214,532 | 5/1993 | Hall. | |
| 5,225,928 | 7/1993 | Dugan. | |
| 5,260,828 | 11/1993 | Londono et al. | 359/565 |
| 5,442,480 | 8/1995 | Swanson et al. | 359/356 |
| 5,493,441 | 2/1996 | Chipper | 359/354 |

FOREIGN PATENT DOCUMENTS 480805  4/1992  European Pat. Off. .............. 359/356

*Primary Examiner*—Jon W. Henry
*Attorney, Agent, or Firm*—William Greener; Joseph R. Dwyer

[57] ABSTRACT

A low weight, achromatic, athermal, long wave infrared objective lens with one element having a positive optical power and the other element having a negative optical power but with a higher thermo-optic coefficient than the thermo-optic coefficient of the first element. A diffractive color correcting optical surface is generated on one surface of one of the elements and aspheric surfaces may be included for further performance gains.

4 Claims, 2 Drawing Sheets

LOW WEIGHT, ACHROMATIC, ATHERMAL, LONG WAVE INFRARED OBJECTIVE LENS

BACKGROUND OF THE INVENTION

This invention relates to an improvement in objective lenses, consisting of two lens elements, for use in the long wave infrared (LWIR) spectral region, approximately 8–12 micrometers (µm) in wavelength or any portion thereof.

Many attempts have been made to develop low weight objective lenses for LWIR applications that are color corrected and which maintain focus over a wide, but slowly varying, temperature range of operation. This is because chromatic aberration and thermally induced focus shifts can seriously degrade image quality. An achromatic optical system is one which brings light of two different wavelengths to the same longitudinal focus position. Without color correction, only a limited portion of the spectral band would be in satisfactory focus at any given axial location of the image plane (or detector array), thereby reducing image quality. Similarly, an athermalized optical system has the ability to maintain a well focused image under isothermal conditions over a finite temperature range. An athermalized design is defined as one in which the amount of thermally induced focus shift created by the optics matches the amount of thermally induced displacement of the detector array as governed by the optical system mechanical configuration and choice of structural materials. Athermalization of such systems by mechanically assisted focused compensation (e.g., by use of motors or nested tubes of different materials) adds significant cost and weight. An optically passive approach achieves athermalization by judicious selection of the optical and structural materials, and by proper distribution of optical power among the lens elements without complex mechanical housing designs.

Due to the limited number of optical materials suitable for LWIR operation and their bulk characteristics, conventional optically passive athermalized solutions, operating at moderate to fast f-numbers, will require at least three optical materials, with some surfaces having relatively steep curvatures. This results in designs which are very sensitive to fabrication and alignment errors, and are expensive and heavy.

This invention is distinguished over the prior art by four attributes. This invention:

1) is passively athermal,
2) is color corrected,
3) provides operation in the LWIR band (8–12 um), and
4) requires only two optical substrates.

The benefits of this invention are high quality imagery, high reliability, low cost and low weight. High quality imagery is preserved because a well focused image is maintained over the requisite operating temperature range. Eliminating complex mechanical solutions or additional optical elements results in high reliability, low cost and low weight.

No prior art has been identified which features all four distinguishing attributes mentioned above.

FIG. 1, shows a prior art two element objective lens with a positive focal length (75 mm diameter, f 2.0) which is color corrected for the LWIR spectal band (9–11 µm, in this example) using conventional lens elements. Due to the bulk properties of the available lens materials, it is not possible to both color correct and athermalize this lens. In this example, lens element 1 is positive and aspheric and lens element 2 is negative and spherical and separated by airspace 3. Normally the positive lens 1 is made of the material with a spectral dispersion which is lower than that of lens 2. Thus, in this example, lens 1 is made from germanium (Ge) and lens 2 is zinc selenide (ZnSe). As shown in the ray fan diagrams of FIG. 2, such a system is well corrected at nominal ambient temperature (20° C.), (yielding 84% ensquared energy in a 50 µm square detector). This lens, however, suffers a serious loss in image quality under isothermal conditions at 60° C. (approximately a ten times growth in blur diameter) (resulting in only 1% ensquared energy in a 50 µm square detector). This is because the material in the positive lens has a higher change in refractive index as a function of temperature (dn/dT) than the material in the negative lens. Because the net optical power of the two elements combined is positive, the amount of power in the positive lens must dominate compared to the amount of power in the negative lens. Thus, as temperature increases, the refractive index of the positive element increases, causing the plane of best focus to move closer to the lens. The detector array 4, however, is moving further away from the lens due to the expansion of the housing 5 (aluminum, in this example) with temperature. Changes in thickness, airspace and radius of curvature of the lens elements are also included in the evaluation of this objective lens at elevated temperature, but their effects are less significant compared to the changes in refractive index and detector array position. The net effect is to produce large amounts of defocus, thus degrading image quality. Unfortunately, in the LWIR band, there are no pairs of commonly used optical materials with the property that one material has a higher spectral dispersion and a higher dn/dT than the other material. This precludes simultaneous color correction and athermalization in a conventional two element objective.

It is recognized that in the midwave infrared (MWIR) region, approximately 3 to 5 µm wavelength, it is possible to design a conventional two element objective lens that has simultanous color correction and athermalization. On the other hand, in the LWIR spectral region, 8 to 12 µm, it is not possible to simultanously color correct and passively athermalize with only two conventional lens elements. This is because the materials' relative dispersions change significantly from the MWIR to the LWIR band.

SUMMARY OF THE INVENTION

It is therefore an object of this invention to provide a two element objective lens which is passively athermal and color corrected for operation in any portion of the 8–12 µm (LWIR) spectral band.

It is another object of this invention to provide a LWIR two element lens which is passively athermal and color corrected which has the benefits of high performance, high reliability, low cost and low weight.

The invention which meets the foregoing objects comprises an objective lens using only two substrates or elements. One lens element has positive optical power and the other lens element has negative optical power. The negative lens also has a higher thermo-optic coefficient than the positive lens element. Their relative spectral dispersions are not important. (The thermo-optic coefficient is usually dominated by the material's dn/dT and is defined to equal (dn/dT)/(n−1)-CTE, where CTE is the lens material coefficient of thermal expansion). A diffractive (or "binary") optical surface is generated on one surface of one of the either element. Aspheric surfaces are not required but may be included on any of the surfaces, including the diffractive optical surface, for further performance gains.

It will become apparent to those skilled in the art that by selecting a material with a higher thermo-optic coefficient for the negative lens element and a lesser thermo-optic coefficient material for the positive lens element, the system can be made athermal but not color corrected. However, by introducing a diffractive optical surface to one of the lens elements, the system can be reoptimized to achieve simultaneous color correction and athermalization, irrespective of the relative dispersions of the two materials.

It is also recognized that binary optics have been used to correct aberrations such as shown in the Chen U.S. Pat. No. 5,044,706, but such approach does not achieve simultaneous LWIR color correction and athermalization in a two element system. The patent to Chen also shows an aspheric optical element with binary optics generated on one surface to reduce the number of lens elements in a multielement system.

BRIEF DESCRIPTION OF THE INVENTION

Figure 1:
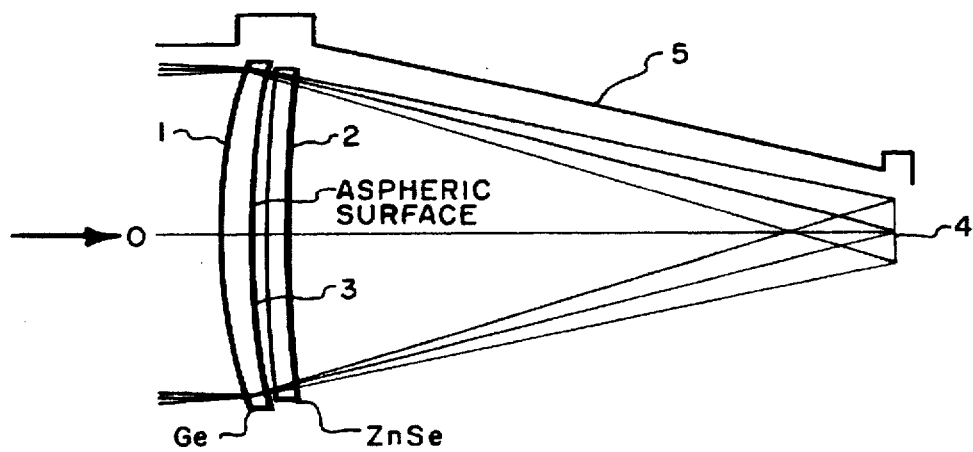
FIG. 1 is a schematic illustration of a conventional two element objective lens of the prior art which is color corrected for the LWIR spectral band but which cannot be simultaneously passively athermalized when mounted in a housing made of aluminum or any commonly used material.
Figure 2:
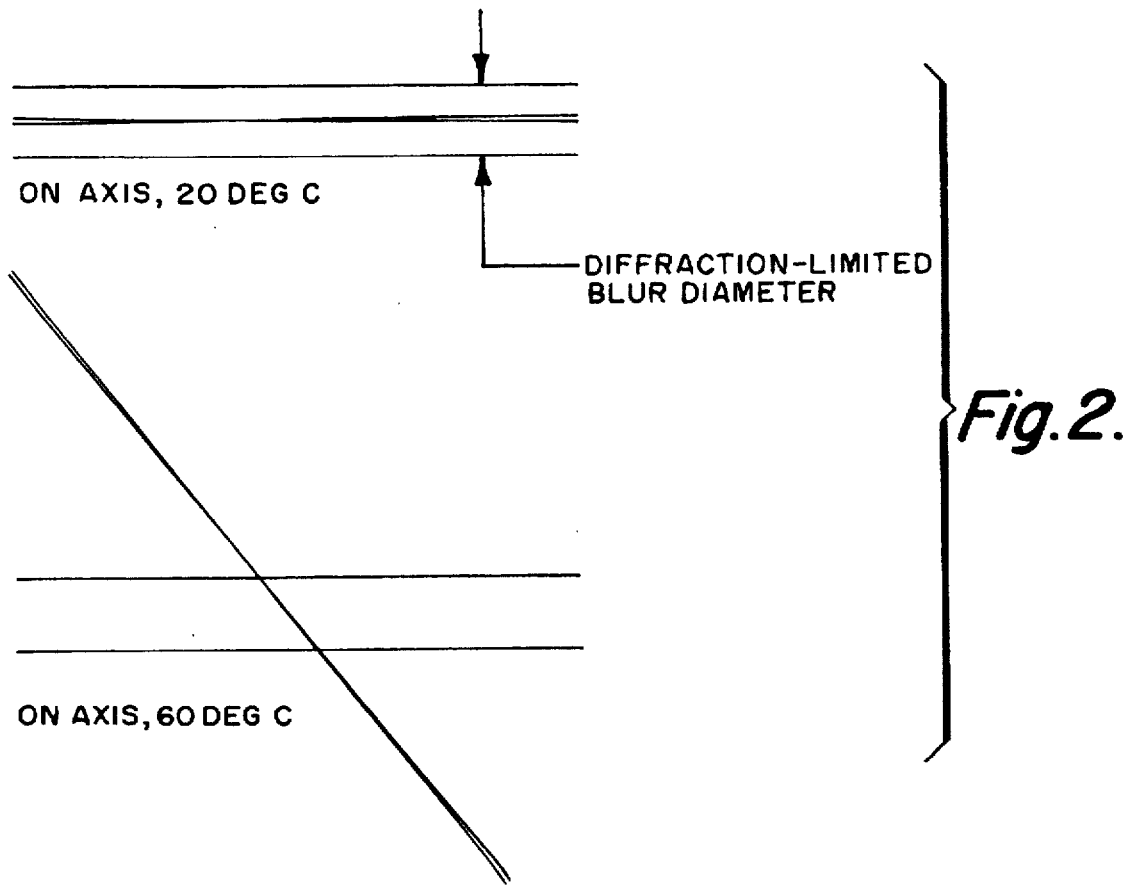
FIG. 2 graphically illustrates image quality at 20° C. (nominal ambient) and at 60° C. for the system in FIG. 1. If the system is focused under isothermal conditions at a particular temperature such as 20° C., it is capable of very good image quality. However, if it is operated at an elevated temperature of 60° C., under isothermal conditions and without refocusing, it yields a severely degraded image quality.

FIGS. 1 and 2 were described in the Background and will not be described further.

Figure 3:
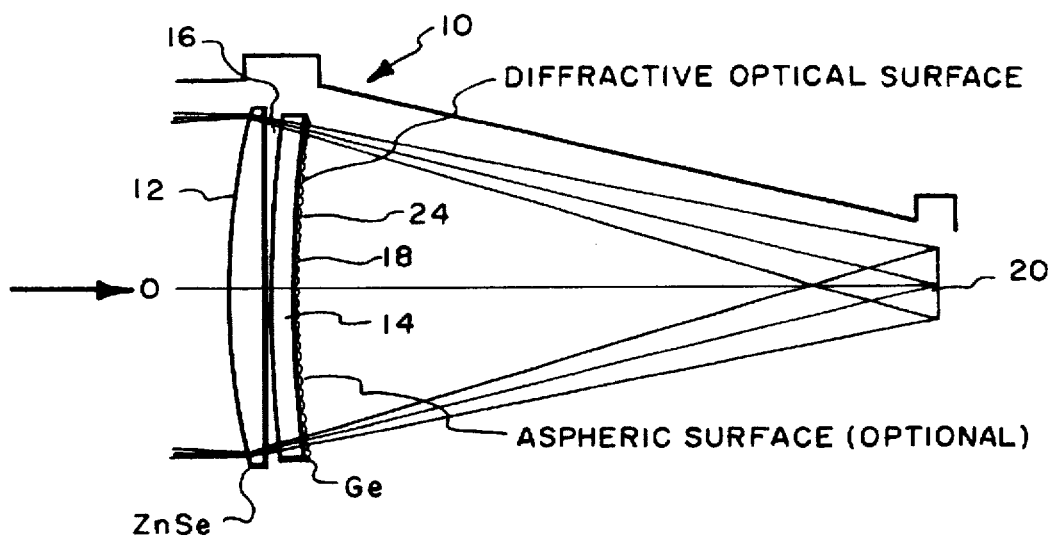
FIG. 3 is a schematic illustration of the two optical element color corrected athermalized LWIR objective lens of the present invention.

FIG. 3 shows the LWIR diffractive hybrid objective lens 10 of this invention as comprising a positive lens 12, and a negative lens 14 with an air space 16 therebetween. In this illustration, surface 18 is aspheric and 0 represents the optical axis of the system. The image plane (detector array) is represented at 20.

The lens system 10 is mounted in a housing 22 shown only schematically. Aluminum is a material of choice for the housing 22 of this embodiment of the invention.

In this embodiment, the positive lens 12 is made of zinc selenide with a lower thermo-optic coefficient (lower dn/dT) than the negative lens 14 which is made of germanium.

In this embodiment also, a diffractive color correcting surface 24 is generated on the negative lens facing the detector array. The diffractive surface 24 is a phase Fresnel lens, also known as a kinoform, or a "binary optics" approximation thereof. The diffractive surface can reside on any of the four available surfaces, its location is determined by manufacturing considerations.

Figure 4:
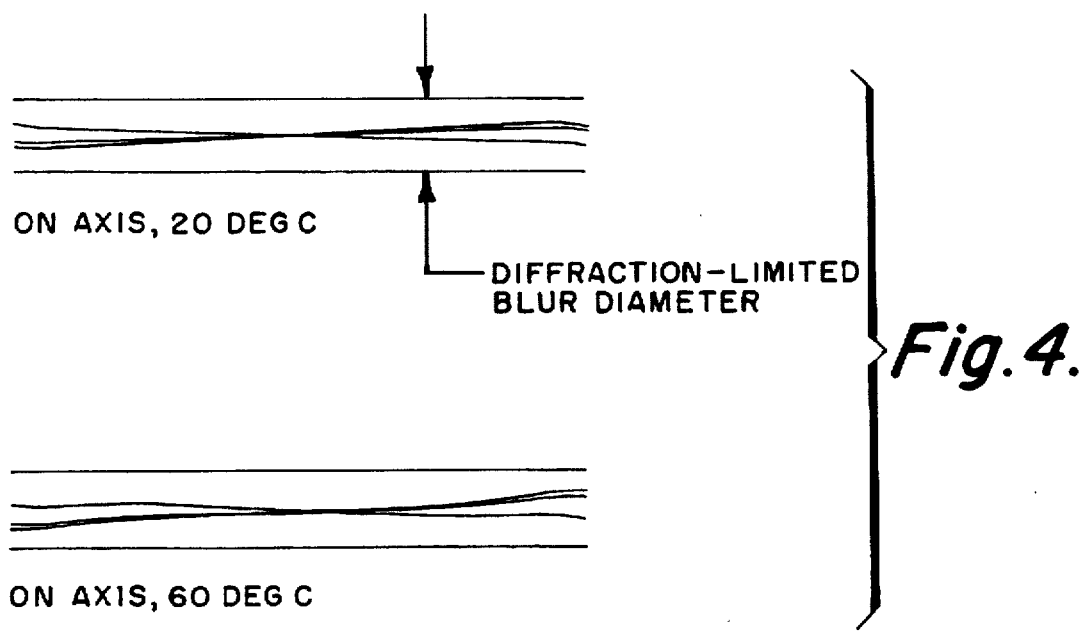
FIG. 4 is a ray fan plot with a lens of the present invention showing that the image quality is diffraction limited over a wide temperature range.

FIG. 4 is a ray fan plot showing the stability of image quality over temperatures ranging from 20° C. to 60° C.

An optical prescription for an exemplary embodiment of this system is shown in the following table. Shown to be feasible is a 75 mm diameter lens system color corrected and athermalized with an f-number of 2.0 operating in the spectral band from 9 to 11 μm.

TABLE

ACHROMATIC AND ATHERMAL LWIR DOUBLET, 2.95 INCH ENTRANCE PUPIL DIAMETER 10.00000 = Wvlg(1)   9.00000 = Wvlg(2)   11.00000 = Wvlg(3)

| No. | Parameter | Kind | Axl. Seprtn. | Axl. Psitn. | Ca. Rd. | Gl. Code | Name |
|---|---|---|---|---|---|---|---|
| 0 | Reference Sfce |  | 0.4259-in | 6.6019 | 0.000 |  |  |
| 1 | 5.6904-in | SP | 0.3560-in | 6.1760 | 1.503 | 5062.300 | ZnSe-CVD |
| 2 | –142.3876-in | SP | 0.0400-in | 5.8200 | 1.477 |  |  |
| 3 | 16.5038-in | SP | 0.1700-in | 5.7800 | 1.437 | 5016.500 | Ge-EP |
| 4 | 10.2245-in | A1 | 0.0000-in | 5.6100 | 1.405 |  |  |
| 5 | 1319.4031-in | D1 | 5.6100-in | 5.6100 | 1.405 |  |  |
| 6 | Image Plane |  | 0.0000-in | 0.0000 | 0.000 |  |  |

Table of Constants

| 4 | 3.900477E + 00 | 0.000000E + 00 | 5.458915E – 06 | 0.000000E + 00 | 0.000000E + 00 |
|---|---|---|---|---|---|
| 5 | 0.000000E + 00 | 8.248561E – 06 | 0.000000E + 00 | 0.000000E + 00 | 0.000000E + 00 |
|   |   |   |   |   | 6.328000E – 01 |

SURFACE TYPE:
SP: Spherical
A1: Standard Aspheric
D1: Rotational diff. optics phase It can be appreciated from the foregoing that with the proper choice of materials for the positive and negative lenses and the addition of a diffractive optical surface, an objective lens system can be designed to be achromatic, athermal and of low weight, using practically any material for the sensor housing. Secondary color ultimately limits the performance of this lens. The amount of secondary color which is generated is dependent upon the diameter of the optical element, the f-number and the spectral band width.

I claim:

1. A low weight, athermal, color corrected objective lens for use in any portion of the 8 to 12 um spectral band generated by an IR source and consisting of, a first optical lens element having positive optical power nearest the source, a second optical lens element having negative optical power between the first optical lens element and its focal plane, the lens material of said second optical lens element having a higher thermo-optic coefficient than the thermo-optic coefficient of the lens material of said first optical lens element and, a diffractive surface generated on one surface of one of said lens elements for color correction so that the entire spectral band of 8 to 12 um is in focus at said focal plane.

2. The lens as claimed in claim 1 wherein said diffractive surface is a kinoform.

3. The lens as claimed in claim 2 wherein one of said optical lens elements is aspheric.

4. A low weight, athermal, achromatic, LWIR objective lens for a source generating IR in the 8–12 spectral band and consisting of, a first optical lens element having positive optical power and positioned to receive light from the IR source first, a second optical lens element having a negative optical power positioned to receive light from the first optical lens element, said second optical lens element having a higher thermo-optic coefficient than the thermo-optic coefficient of said first optical lens element, one surface of one of said optical elements being diffractive in form so that the entire spectral band of 8–12 um is in focus at the focal plane of said second optical lens element.

* * * * *